Patented Apr. 12, 1949

2,467,105

UNITED STATES PATENT OFFICE

2,467,105

PRODUCTION OF POLYALLYL ALCOHOLS

David E. Adelson and Harold F. Gray, Jr., Berkeley, Calif., assignors to Shell Development Company, San Francisco, Calif., a corporation of Delaware No Drawing. Application August 16, 1944, Serial No. 549,792

3 Claims. (Cl. 260—91.3)

This invention relates to a process for producing polymeric beta,gamma-olefinic alcohols and more especially for producing polyallyl alcohol. In particular, the invention pertains to a method for obtaining polyallyl alcohol from carboxylic acid esters thereof.

It is known that polyvinyl alcohol can be produced by saponifying a polyvinyl ester such as polyvinyl acetate with an aqueous solution of a saponifying agent like mineral acids or bases, and that this desired saponification can be effected with no other solvent material present in the reaction mixture than water. Thus, polyvinyl acetate can be saponified with an aqueous solution of sodium hydroxide so as to produce polyvinyl alcohol and no other agent need be present in the reaction mixture in order to obtain the desired product.

In contrast to the behavior of polyvinyl acetate we found that polyallyl acetate was not saponified when treated with an aqueous solution of a saponification agent. This difference in ability to saponify between polyvinyl acetate and polyallyl acetate is shown by the following example wherein we attempted to saponify polyallyl acetate to polyallyl alcohol with an aqueous solution of sodium hydroxide.

Example I

Polyallyl acetate was prepared by heating 1579 grams of allyl acetate in which had been dissolved 31.6 grams of benzoyl peroxide for 382 hours at 65° C. The unpolymerized allyl acetate was removed by distillation in vacuo. About 34.8% of the monomer was converted and recovered as polyallyl acetate.

About 50 grams of the polyallyl acetate was added to an aqueous solution consisting of 200 cc. of water and 20.3 grams of sodium hydroxide. The mixture was contained in a flask fitted with a reflux condenser and heated by placing the flask in an oil bath whereby refluxing occurred for about 8 hours. Although the mixture was boiled and refluxed during this entire period, the saponification of the polyallyl acetate did not occur.

While the use of an aqueous solution of a saponification agent did not saponify the polyallyl acetate as would be expected from the behavior of polyvinyl acetate, we have now found a method whereby saponification of the polyallyl acetate can be effected. By heating the polyallyl acetate with the aqueous solution of the saponification agent while also having present in the reaction mixture at least ¼ volume of a lower aliphatic non-tertiary alcohol per volume of water, the saponification reaction can be made to occur and the desired polyallyl alcohol is produced. For this purpose the lower aliphatic alcohol used in the method is one in which the polyallyl alcohol is soluble. Polyvinyl alcohol, as is known, is insoluble in even the lowest member of the aliphatic alcohols, namely, methyl alcohol. Among suitable alcohols to have present in the reaction mixture of the process of this invention are methyl, ethyl, propyl, isopropyl, n-butyl, sec-butyl, isobutyl, n-amyl, sec-amyl, isoamyl, neo-pentyl, allyl, crotyl, 3-butenyl, n-hexyl, sec-hexyl, 2-ethylhexyl, n-octyl, sec-octyl, decyl, dodecyl, etc. While the alcohol is preferably a monohydroxyl alcohol containing not more than 4 carbon atoms, non-tertiary polyhydric alcohols are also suitable such as ethylene glycol, propylene glycol, trimethylene glycol, butylene glycol, glycerol, pentaerythritol, alpha- or beta-methylglycerol, etc. If desired, a mixture of different alcohols or isomeric alcohols can be used. Although the alcohol need not be one which is completely miscible with water, it is preferable to employ an alcohol having such properties like methyl, ethyl, n-propyl or isopropyl alcohols, or ethylene glycol, propylene glycol, glycerol, etc. The method of the invention enables production of polymeric beta,gamma-monoolefinic monohydric alcohols from any suitable carboxylic acid ester thereof. By "a beta,gamma-monoolefinic monohydric alcohol" is meant a member of the class of unsaturated alcohols which have an olefinic linkage between two carbon atoms which are in the beta and gamma positions with respect to the alpha carbon atom of the alcohol which has the hydroxyl group directly linked thereto. In other words, the unsaturated alcohols have but a single olefinic linkage and this is contained between two carbon atoms, one of which is linked directly to a saturated carbon atom having the hydroxyl group linked directly thereto. The simplest member of the class is allyl alcohol.

The starting materials used in the process of the invention are suitable carboxylic acid esters of the polymeric beta, gamma-monoolefinic monohydric alcohols. The methods of preparing these polymeric esters are known and need not be discussed here. Representative materials which are treated according to the process of the invention include the formates, acetates, propionates, n-butyrates, isobutyrates, valerates, caproates, heptoates, nonoates, laurates, myristates, permates, stearates, oxalates, malonates, succinates, chlorstearates, adipates, diglycolates, dihydroacrylates, benzoates, tellurates, phthalates, terephthalates, hexahydrophthalates, citrates, tricarballylates of polyallyl alcohol, polymethallyl alcohol, polycrotyl alcohol, polycinnamyl alcohol, polyphenyl allyl alcohol as well as polymeric methyl vinyl carbinol, ethyl vinyl carbinol, methyl isopropenyl carbinol, 2-pentenol, 2-hexenol, 2-decenol, cyclopentenol, cyclohexen-2-ol, methylcyclohexen-2-ol, cyclohexyl isopropenyl carbinol, and the like. These starting materials of polymeric esters are derived from carboxylic acids which are devoid of olefinic and acetylenic unsaturation. As is known, polymerization of such carboxylic acid esters of the beta,gamma-olefinic alcohols occurs by coupling through the olefinic linkage of the saturated alcohol portion of the ester molecules. The saponification reaction in the method of the invention frees the polymeric alcohol of its acid constituent, and since the treated reaction mixture thus contains the polymeric alcohol which must be recovered from the admixture with the freed acid, a polymeric ester is employed as starting material which has not had polymerization occur through the carboxylic acid portion of the molecule. For this reason the polymeric ester is one from a carboxylic acid devoid of olefinic and acetylenic linkages (devoid of aliphatic carbon-to-carbon double bonded and triple bonded linkages).

The polymeric esters may be either normally liquid or normally solid polymers. Ordinarily the polymeric esters of monocarboxylic acid such as polyallyl acetate are liquid polymers at normal temperatures while those form polycarboxylic acids such as polymeric diallyl phthalate are normally solid. The lower polymers of esters of polycarboxylic acids may, however, be normally liquid, and these are also suitable. When solid polymers are employed it is preferable to break up the solid by means of grinding, cutting, shaving, or the like so that the material to be treated is in the form of small pieces or a powder.

For the purpose of illustrating some of the details and possible variations of the polymeric esters, saponification agents, reaction conditions as well as the monomeric alcohol which makes the process of the invention possible, the following examples are given although it is to be understood that these examples are not to be construed as limitative of the invention.

Example II

A solution of 31.6 grams benzoyl peroxide in 1579 grams allyl acetate was heated in an oven at 65° C. for 382 hours. The unpolymerized allyl acetate was removed by distillation in vacuo. The residual polyallyl acetate was pale yellow in color.

| | Per cent |
|---|---|
| Conversion to polymer | 34.8 |
| Recovered as monomer | 64.9 |
| Loss | 0.3 |

A mixture of 50 grams of the polyallyl acetate, 20.3 grams of sodium hydroxide, 200 cc. of water and 100 cc. of methyl alcohol was refluxed in an oil bath. Refluxing was continued until it appeared that the saponification was substantially complete. The methyl alcohol was then removed by steam distillation and the reaction mixture neutralized with hydrochloric acid. The material was concentrated somewhat and upon cooling the polyallyl alcohol separated as a dark colored, soft solid which was partly soluble in hot water, soluble in ethyl alcohol and insoluble in acetone. A yield of 19.5 grams was obtained.

Example III

A solution of 1.5 grams benzoyl peroxide in 75 grams diallyl oxalate was heated at 50° C. in an oven for 4 weeks. The product, a brittle, transparent resin, analyzed as follows:

| | Found | Calculated for Polydiallyl Oxalate Resin |
|---|---|---|
| Carbon percent | 55.6 | 56.5 |
| Hydrogen do | 5.9 | 5.9 |
| Oxygen (By diff.) do | 38.5 | 37.6 |

A mixture of 6 grams polydiallyl oxalate, 100 grams methanol, and 3 cc. concentrated sulfuric acid was refluxed until solution was complete (24 hours). After neutralizing the acid and removing the methanol, a sticky, resinous mass of polyallyl alcohol was obtained which still contained some inorganic salts.

Example IV

A mixture of 10 grams of polydiallyl oxalate, prepared as in Example III, 10 grams potassium hydroxide and 150 cc. absolute methanol was refluxed for 8 hours. After removing the precipitated potassium oxalate, the solvents were evaporated and the residue was soaked in 50 cc. of 1 N acetic acid containing 5 grams of sodium acetate and finally washed with water. The residue (2 grams) was a rather tough, yellow material which left no ash upon ignition. It was swollen by water at room temperature and dissolved upon heating; it was unaffected by acetone and isopropyl alcohol. Analysis indicated that the polyallyl alcohol was impure.

| | Found | Calculated for Polyallyl Alcohol |
|---|---|---|
| Carbon percent | 56.5 | 62.1 |
| Hydrogen do | 10.3 | 10.3 |

Example V

A mixture of 10 grams polydiallyl oxalate, prepared as in Example III, 100 cc. concentrated hydrochloric acid and 100 cc. methanol was refluxed until solution was complete (approximately 5 hours). Evaporation of the solvents gave a rubbery, brown mass which was subsequently freed from hydrogen chloride and oxalic acid by extraction with water in a Soxhlet apparatus. This yielded 5 grams polyallyl alcohol which was probably dehydrated to a small degree:

| | Found | Calculated For | |
|---|---|---|---|
| | | Polyallyl Alcohol | Polyallyl Ether |
| Carbon percent | 64.5 | 62.1 | 74.0 |
| Hydrogen do | 10.0 | 10.3 | 10.3 |
| Oxygen (By diff.) do | 25.5 | 27.6 | 15.7 |

A sample of polyallyl alcohol prepared in this fashion was heated in a mold at 150° C. and 3,500 lb. per sq. in. pressure. This yielded a dark, brown, brittle opaque resin which was still fusible and slightly swollen by hot water. Analyses indicated that the material was substantially unchanged by the molding treatment.

|  | Found |
|---|---|
| Carbon _____per cent__ | 64.5 |
| Hydrogen _____do____ | 10.0 |
| Oxygen (by diff.) _____do____ | 25.5 |

*Example VI*

A mixture of 28 grams of the polyallyl acetate prepared as described in Example IV, 100 grams ethyl alcohol and 20 cc. concentrated hydrochloric acid was refluxed under a column. A ternary boiling azeotrope comprising ethyl alcohol, ethyl acetate and water distilled. The product, polyallyl alcohol, was similar in appearance to that obtained in Example IV. The high yield of product, 20 grams (expected yield, 16.3 grams), indicated that some of the hydroxyl groups of the polyallyl alcohol were still acetylated.

From the foregoing examples it is evident that in order to effect the desired saponification (which term is used in its common broad sense for either alkaline or acid hydrolysis of esters), the use of a saponification agent is necessary. By "a saponification agent," reference is made to the widely known meaning of the term wherein it is meant to designate any substance capable of effecting splitting of esters in the presence of water into an alcohol and an acid or acid salt. Thus, the saponification agent can be bases such as sodium hydroxide, potassium hydroxide, lithium hydroxide, calcium hydroxide, barium hydroxide, methyl ammonium hydroxide, or a strong mineral acid such as hydrochloric acid, hydrobromic acid, sulfuric acid, phosphoric acid, etc. as well as a material such as Twitchell's reagent. When bases are used and it is desired to at least completely saponify the polymeric ester it is necessary to employ at least an equivalent quantity of the base since it is consumed in neutralizing the carboxylic acid realized from the polymer. With an acid saponification agent, satisfactory results are attained with from about 1% to 10% of acid based on the weight of the polymeric ester. It is usually preferred to employ a basic agent since the polymeric alcohols tend to have darker colors when acidic saponification agents are used than when bases are used. However, when it is desired to produce a pure polymeric alcohol free of foreign constituents the use of an acidic agent is more feasible since upon completion of the saponification the crude reaction mixture containing a free acid saponification agent may be percolated through a bed of an anion exchange resin Amberlite IR-4. Method of removing the saponification agents or salts formed by the saponification reaction by ion-exchange resins are described in copending application of Whetstone, Serial No. 515,837, filed December 27, 1943.

The temperature at which the process of the invention is effected is one of at least 50° C. in order for the desired saponification reaction to be realized. The upper limit of the reaction temperature is not critical but, in general, should not be above about 200° C. Effecting the reaction between about 60° C. and 120° C. is usually desirable and the time for completion of reaction is considerably shortened by working at the upper end of that range as compared to effecting the saponification at the lower end. When the operating temperature is above the boiling temperature of the reaction mixture, the use of appropriate superatmospheric pressure sufficiently high to keep the reaction mixture from entirely vaporizing is employed. A particularly convenient temperature of reaction is the boiling temperature at the prevailing atmospheric pressure. This temperature is used when the reaction mixture is refluxed and such procedure was employed in most of the foregoing examples. For this purpose the necessary ingredients of the reaction mixture are added to a vessel fitted with a reflux condenser. The vessel and contents are heated, and at above about 50° C., the desired saponification reaction forms the polymeric alcohol. The heating is continued until and while the reaction mixture refluxes. It is discontinued when the reaction is complete in order to obtain completely saponified polymeric ester, or prior to that time if a partially saponified ester (mixed polymeric ester-alcohol) is desired. The saponification can be effected continuously by feeding the mixture of ingredients into a unitary heated reaction vessel or a tubular reaction system fitted with a heated time tank of the usual type and continually withdrawing an equivalent volume of the reaction mixture therefrom.

As explained hereinbefore, the saponification of the polymeric ester is made possible by inclusion of a lower aliphatic, non-tertiary alcohol in the aqueous reaction mixture and at least ¼ volume of alcohol per volume of water in the reaction mixture. If desired, the alcohol can be present in the reaction mixture in such a quantity that very little water is contained therein. It is, however, desirable to have present at least an amount of water equivalent to the polymeric ester so as to provide the water of reaction needed for the saponification and this is usually true when an acidic saponification agent is employed.

When an acidic saponification agent is used, including HCl and $H_2SO_4$, and a polymeric ester of a monocarboxylic acid is treated, the carboxylic acid released from the polymeric ester by the saponification reaction can be directly separated from the reaction mixture substantially as fast as formed. This is accomplished by distilling from reaction mixture a tertiary azeotrope of water, the monomeric alcohol and the monocarboxylic acid ester thereof. The carboxylic acid released from the polymer re-esterifies with the monomeric alcohol in the reaction mixture owing to the presence of the acidic saponification agent, which, in this case, also functions as an esterification catalyst. By condensing and cooling the azeotrope distilled from the reaction mixture, two layers form and the aqueous layers can be returned as reflux to the fractionating column. In general, the lower aliphatic, non-tertiary alcohol is removed from the reaction mixture at the end of the saponification treatment by distillation along with the water contained therein. The saponification agent can be neutralized when it is acidic either prior to or subsequent to this treatment. When a basic agent is used, the carboxylic acid salt of the base is formed and this can be removed by cooling the reaction mixture so as to crystallize the salt which is filtered from the reaction on mixture or by extracting the polymeric alcohol therefrom as well as by extracting the salt from the polymeric alcohol.

The polymeric beta,gamma-monoolefinic monohydric alcohols produced by the present and approved process are very valuable materials. Since the polymer contains a plurality of hydroxyl groups it can be reacted with dicarboxylic acids to form alkyd resins, with drying oil acids to form synthetic drying oils, with aldehydes to form acetal resins, with nitric acid to form nitrates which are explosives, etc. The lower polymers are water soluble and are thus useful as humectants, as grease-proof coatings, for textile-sizing agents, etc.

We claim as our invention:

1. An improved process for the production of polymeric alcohol which comprises saponifying at 50° C. to 200° C. a carboxylic acid ester of a polymeric beta,gamma-monoolefinic monohydric alcohol to the corresponding polymeric alcohol, the carboxylic acid being devoid of olefinic and acetylenic unsaturation, said saponification being effected with the polymers in a medium consisting of a lower aliphatic, non-tertiary alcohol, a saponification agent, and from a stoichiometric equivalent of water based upon the amount of said polymeric ester up to four volumes of water per volume of said alcohol.

2. An improved process for the production of polyallyl alcohol which comprises saponifying polyallyl acetate to polyallyl alcohol at a temperature of 50° C. to 200° C. in an aqueous medium consisting of a lower aliphatic, non-tertiary monohydric alcohol of up to 4 carbon atoms, a saponification agent, and from a stoichiometric equivalent of water based upon the amount of said polymeric ester up to four volumes of water per volume of said alcohol.

3. An improved process for the production of polyallyl alcohol which comprises saponifying polyallyl acetate to polyallyl alcohols in an aqueous medium consisting of ethyl alcohol, hydrogen chloride, and from a stoichiometric equivalent of water based upon the amount of said polymeric ester up to four volumes of water per volume of the ethyl alcohol, said saponification being effected at the normal boiling temperature of the reaction mixture while separating the forming ethyl acetate therefrom as the ternary azeotrope with water and ethyl alcohol substantially as fast as formed.

DAVID E. ADELSON.
HAROLD F. GRAY, Jr.

REFERENCES CITED

The following references are of record in the file of this patent:

UNITED STATES PATENTS

| Number | Name | Date |
| --- | --- | --- |
| 1,897,856 | Noller | Feb. 14, 1933 |
| 2,109,883 | Herrmann | Mar. 1, 1938 |
| 2,332,460 | Muskat | Oct. 19, 1943 |
| 2,332,900 | D'Alelio | Oct. 26, 1943 |